United States Patent
Takizawa et al.

(10) Patent No.: US 6,191,884 B1
(45) Date of Patent: Feb. 20, 2001

(54) INFRARED-BLOCKING TRANSPARENT FILM

(75) Inventors: Tsuyoshi Takizawa; Shinichi Takahashi, both of Shizuoka (JP)

(73) Assignee: Tomoegawa Paper Co., Ltd., Tokyo (JP)

(*) Notice: Under 35 U.S.C. 154(b), the term of this patent shall be extended for 0 days.

(21) Appl. No.: 09/311,528

(22) Filed: May 13, 1999

(30) Foreign Application Priority Data

May 20, 1998 (JP) ................................................ 10-139037

(51) Int. Cl.[7] .................. F21V 9/04; G02B 5/08; G02B 5/22; B05B 5/00
(52) U.S. Cl. ................ 359/359; 359/350; 252/587; 252/582; 427/162; 427/164
(58) Field of Search .................. 359/350, 359, 359/885; 252/587, 582, 518; 428/238; 430/6; 427/162, 164, 165

(56) References Cited

U.S. PATENT DOCUMENTS

| | | | |
|---|---|---|---|
| 5,518,810 | * | 5/1996 | Nishihara et al. .................. 428/238 |
| 5,804,102 | * | 9/1998 | Oi et al. .............................. 359/350 |
| 5,807,511 | * | 9/1998 | Kunimatsu et al. ................. 252/587 |

FOREIGN PATENT DOCUMENTS

| | | |
|---|---|---|
| 07069632 | 3/1995 | (JP) . |
| 07070363 | 3/1995 | (JP) . |
| 08041441 | 2/1996 | (JP) . |

\* cited by examiner

*Primary Examiner*—Audrey Chang
(74) *Attorney, Agent, or Firm*—Scully, Scott, Murphy & Presser

(57) ABSTRACT

An infrared ray blocking transparent film which can be very thin and have greater transparency and higher adhesion than that of conventional films; the cost for forming the film can be lower due to the reduced amounts of forming materials used for the infrared ray blocking layer, is disclosed. An infrared ray blocking layer is provided on a surface of a base film, by coating conductive materials including indium tin oxide powder and resin; a hard coat layer is provided on a surface of the infrared ray blocking layer; an adhesive layer is provided on a rear surface of the base film. Since resin employed in the infrared ray blocking layer is UV-curing resin including photo-cationic polymerization initiator, thickness of the layer is reduced, and transparency and adhesion thereof are improved.

18 Claims, 1 Drawing Sheet

INFRARED-BLOCKING TRANSPARENT FILM

BACKGROUND OF THE INVENTION

The present invention relates to an infrared ray blocking transparent film, for example, a film to be adhered to a windowpane of a building, an automobile, or the like, primarily in order to block infrared rays in sunlight.

Transparent films having infrared ray blocking properties, transparency (transmissivity) to visible light, and properties of reflection or absorbing of infrared light, have been used for controlling the thermal effects of solar radiation. For example, infrared ray blocking transparent films are adhered to windowpanes of buildings, automobiles, and the like so as to reduce heat from direct sunlight being transmitted therethrough. In the summer, the air conditioning load may be reduced by suppressing the elevation of room temperature, and in the winter, the heat insulating efficiency at room temperature is improved. As an additional effect, if the windowpane is broken, the scattering of pieces of glass is prevented. In general, such an infrared ray blocking transparent film is formed in such a way that an infrared ray blocking layer is provided on one surface of a base film composed of a synthetic resin such as PET (polyethylene terephthalate) or the like, a hard coat layer as a surface protective layer is laminated on another surface of the base film, and a separate material composed of paper, film, or the like, is adhered via an adhesive layer on the surface of the infrared ray blocking layer. When the film is to be affixed, the separate material is removed, whereby the adhesive layer may be adhered to a glass plate, etc.

The infrared ray blocking layer has been formed on a base film by coating infrared ray blocking agents such as various kinds of infrared ray absorbers (for example, immonium, aluminum or anthraquinone-type compounds), infrared ray reflecting materials (for example, ZnO, $SnO_2$, phthalocyan-type pigments, etc.), or the like. However, when the above-mentioned infrared ray blocking agents are used, the layer is a dark brown or a dark blue, whereby transparency of the layer is inferior since visible light transmissivity is lowered to 50% or less. Alternatively, the layer can absorb only infrared rays having longer wavelengths than that ranging from 1000 to 1500 nm, or the layer can absorb only infrared rays having a very small range of wavelengths. Therefore, in order to overcome the above-described conventional defects of the infrared ray blocking agent, indium tin oxide powder (hereinafter referred to as ITO) was developed as a conductive coating material. This ITO powder is coated to form a thin film on a base film by a vacuum deposition method, a sputtering method, a method for coating the coating material for the infrared ray blocking layer by dispersing it into resin, or the like, thereby reflecting infrared rays having wavelengths ranging from 800 to 2500 nm, so that an infrared ray blocking film having high transparency can be provided.

However, in order to provide the above-described ITO powder on the base film by a vacuum deposition method or a sputtering method, a high-vacuum performance apparatus and a high-precision atmosphere controlling system are required, thereby causing problems in that the cost of production is increased and adversely affects mass-productivity, or the like. Therefore, as a method for forming a thin film without these problems, the above-described coating method may be preferably employed. As the resin forming the infrared ray blocking layer by this method, a typical resin for forming a coating film such as a UV-curing resin such as an acrylic-type resin, urethane-type resin, epoxy-type resin, or the like; a thermosetting resin such as melamine resin, polyurethane resin, silicone resin, silicone-modified resin, or the like; and a thermoplastic resin such as an acrylic-type resin, urethane-type resin, or polyester-type resin; or the like, which have high transparency similar to that of a base film, can be chosen and employed suitably. In order to produce the above-described lamination, the following method can generally be employed. A first film in which a hard coat layer is coated on a surface of a base film and an infrared ray blocking layer is coated on a rear surface of the base film and a second film in which an adhesive layer is coated on one surface of a separate material are produced, respectively, and the infrared ray blocking layer of the first film is adhered on the adhesive layer of the second film, whereby both films are laminated to each other.

The infrared ray blocking transparent film is required to have high transparency as well as durability, that is hardness, in the case in which the film is adhered to glass etc. However the above-described thermosetting resin, thermoplastic resin or the like is not cured in a thin film and in the case in which a UV-curing resin is employed, thickness of the film is required to be about 3 μm in order to sufficiently cure, therefore, there was a limit to the improvement of transparency by thinning the film. According to the above-described laminating method, the ITO powder or a pigment included in the resin is exposed on a surface of the infrared ray blocking layer, thereby causing minute unevenness. This unevenness is difficult to bury into the adhesive layer adhered to layers. Therefore, the haze degree thereof increased, whereby high transparency was difficult to obtain. Even if hardness of a surface is obtained by providing a hard coat layer on a film providing an infrared ray blocking layer, with respect to the above resin, there is limit to improvement of hardness of the infrared ray blocking layer, and satisfactory results have not been obtained. In the case in which the film is adhered to a glass, adhesion between each layer becomes insufficient over time due to the effects of sunlight, etc., thereby resulting in peeling off of the layers. In addition, in the case in which the thickness of the infrared ray blocking layer is about 3 μm as described above, a considerable amount of the ITO powder must be used, whereby it was difficult to reduce the cost since the ITO powder is relatively expensive.

Therefore, it is an object of the present invention to provide an infrared ray blocking transparent film which can have higher transparency and which can be produced at lower cost than conventional films, which can improve the hardness of the overall film, and which can exhibit excellent adhesion and superior durability.

SUMMARY OF THE INVENTION

The inventors have conducted from various research with regard to a resin in which an ITO powder is mixed and dispersed and to forming an infrared ray blocking layer, and consequently, they have discovered that thinning of the film, improvement of hardness and superior adhesion (peeling resistance) are attained by using a UV-curing resin including a photo-cationic polymerization initiator as the above resin. Therefore, the infrared ray blocking transparent film according to the present invention is characterized in that an infrared ray blocking layer in which ITO powder is mixed and dispersed in resin is provided on a surface of a base film, and the resin comprising the infrared ray blocking layer is a UV-curing resin including a photo-cationic polymerization initiator.

In the infrared ray blocking transparent film according to the present invention, as a coating material for the infrared ray blocking layer, a UV-curing resin including a photo-cationic polymerization initiator, mixed and dispersed an ITO powder, is employed, and the infrared ray blocking layer is formed by coating this coating material on a base film. As a method for coating on a base film, a wire bar coating method, a doctor blade coating method, a gravure coat method, a dip coat method, or the like, can be used. The inventors have confirmed that the coating material for the infrared ray blocking layer employed for the UV-curing resin according to the present invention, can be cured even in a thin film having a thickness of about 0.5 μm. Therefore, the infrared ray blocking layer can be much thinner than conventional films. Haze degree of the overall film, for example, HAZE value according to Japanese Industrial Standard K7105, is lowered to 1.0 or less by thinning the infrared ray blocking layer, thereby obtaining improved transparency. Consequently, the amount of the ITO powder used is reduced, whereby the overall cost can be reduced. The inventors have confirmed that the UV-curing resin according to the present invention has greater hardness than the above-described conventional resins. Therefore, the hardness of the overall film is improved and the adhesion to the base film is superior, whereby films having sufficient durability can be obtained.

In the following, the component materials for each layer of the infrared ray blocking transparent film having the above-described composition according to the present invention will be explained in detail.

A. Base Film

As a base film, a conventional transparent film can be employed. For example, various resin films such as polyethylene terephthalate (PET), triacetyl cellulose (TAC), polyacrylate, polyether, polycarbonate, polysulfone, polyether sulfone, cellophane, polyethylene, polypropylene, polyvinyl alcohol, or the like, may be preferably employed.

B. ITO Powder

With regard to an ITO powder mixed and dispersed in the infrared ray blocking layer according to the present invention, the average particle size thereof is preferably 100 nm or less, is more preferably 50 nm or less and is most preferably 25 to 35 nm, from the viewpoint of transparency and uniformity.

ITO powders can be obtained by well-known methods. For example, an aqueous solution including a water soluble salt of In and a small amount of water soluble salt of Sn is reacted under alkali conditions, whereby a hydroxide of In and Sn is coprecipitated. Then, the coprecipitated compound is obtained as a raw material, the raw material is sintered in a reducing atmosphere of CO, $NH_3$, $H_2$, or the like, and is transformed into an oxide, whereby an ITO powder is obtained. The ITO powder may be obtained by sintering the raw material in a reducing atmosphere. The mole ratio of $In/Sn/O_2$ is 100/5~10/0.5~10, and is preferably 100/5~10/0.5~2. Such obtained ITO powders turn blue. Such ITO powders are extremely excellent in infrared ray blocking so that the shortest wavelength blocked is 800 nm.

C. UV-Curing Resin Containing Photo-Cationic Polymerization Initiator

As a UV-curing resin mixed and dispersed with the ITO powder, a monomer containing at least one of an acrylic-type resin or an epoxy-type resin, containing photo-cationic polymerization initiator, is preferably employed. The contained acrylic-type resin is preferably controlled for properties of coating materials or coating films, such as adhesion, cross-linking density, thermal resistance, chemical resistance, or the like.

As an example of epoxy-type compounds, a glycidyl ether such as tetramethylene glycol diglycidyl ether, propylene glycol diglycidyl ether, neopentyl glycol diglycidyl ether, bisphenol A diglycidyl ether, or the like, an epoxy ester such as 2-hydroxy-3-phenoxypropyl acrylate, an adduct of bisphenol A-diepoxy-acrylic acid, or the like, as well as a monomer and an oligomer such as an alicyclic epoxy represented by following formulas, can be mentioned.

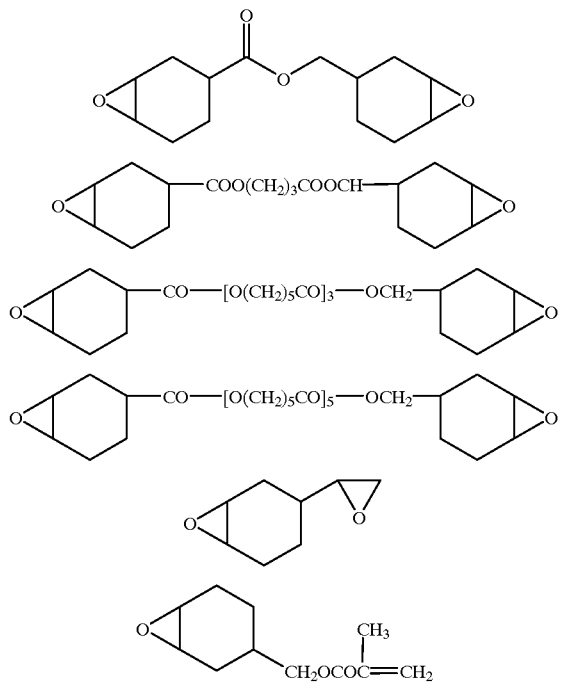

As an example of such acrylic compounds, an acrylic acid derivative such as a mono-functional acrylate such as lauryl acrylate, ethoxydiethylene glycol acrylate, methoxytriethylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxy acrylate, or the like; a multi-functional acrylate such as neopentyl glycol diacrylate, 1,6-hexanediol diacrylate, trimethylolpropane triacrylate, pentaerythritol triacrylate, pentaerythritol diacrylate, dipentaerythritol hexaacrylate, or the like; trimethylolpropane acrylic benzoate, trimethylpropane benzoate, or the like; a methacrylic acid derivative such as a mono-functional methacrylate such as 2-ethylhexyl methacrylate, n-stearyl methacrylate, cyclohexyl methacrylate, tetrahydrofurfuryl methacrylate, 2-hydroxyethyl methacrylate, 2-hydroxybutyl methacrylate, or the like; a multi-functional methacrylate such as 1,6-hexanediol dimethacrylate, trimethylolpropane trimethacrylate, glycerin dimethacrylate, or the like; a monomer and an oligomer such as an urethane acrylate such as glycerin dimethacrylate hexamethylene diisocyanate, pentaerythritol triacrylate hexamethylene diisocyanate, or the like; can be mentioned. Furthermore, other compounds containing at least one of the compounds represented by the following formulas can be employed.

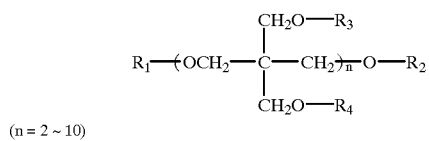

(n = 2 ~ 10)

wherein at least of $R_1$, $R_2$, $R_3$ and $R_4$ is

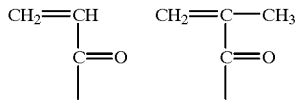

and the others represent alkyl groups. These alkyl groups are preferably lower alkyl groups having one to six carbon atoms.

As a photo-cationic polymerization initiator, compounds represented by the following formulas can be employed. In the following formulas, $R_1$ represents hydrogen or an alkyl group having one to six carbon atoms, $R_2$ and $R_3$ represent an alkyl group having one to six carbon atoms. These can be employed alone or in combination.

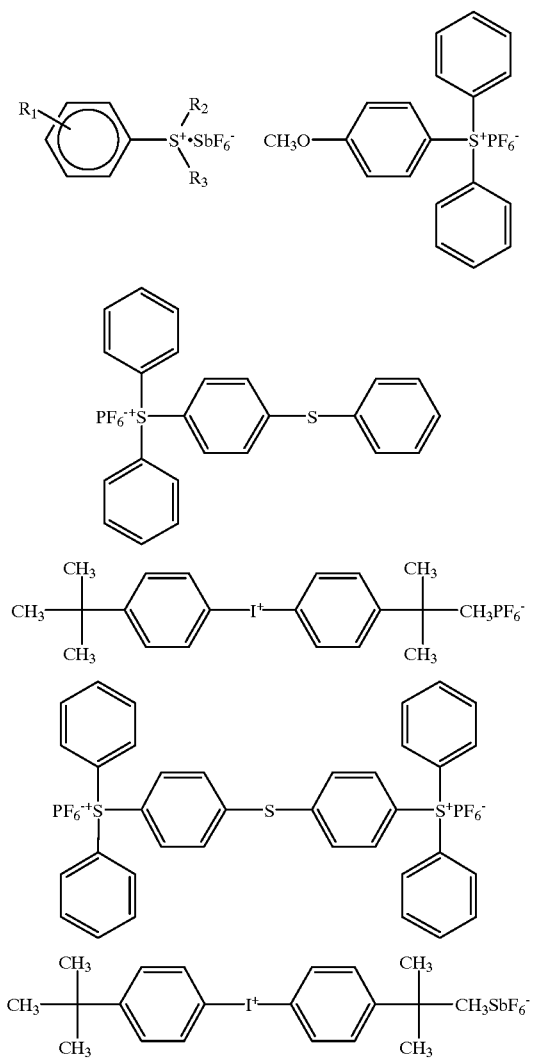

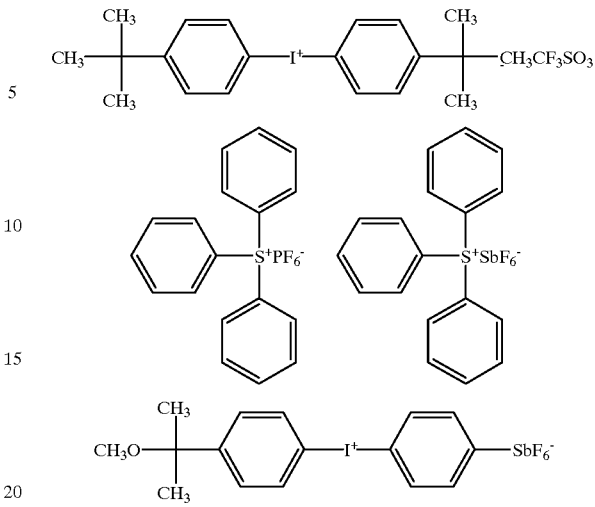

The photo-cationic polymerization initiators are preferably employed in an amount of 0.1 to 10.0% by weight, based on the primary agent. With less than 0.1% by weight or more than 10.0% by weight of the photo-cationic polymerization initiators, UV-curing is insufficient.

The higher the transparency of the UV-curing resin, the better the UV-curing resin. The light transmittance according to Japanese Industrial Standard C6714 is preferably 80% or more and more preferably 90% or more.

With regard to the compounding ratio of the ITO powder and the resin in the coating materials for the infrared ray blocking layer consisting of the UV-curing resin containing ITO powder and photo-cationic polymerization initiator, in the case in which the compounding ratio of the ITO powder and the resin is 90/10 to 60/40 by weight, preferably 85/15 to 65/35, and more preferably 80/20 to 70/30, infrared ray blocking films can be obtained which have excellent infrared ray blocking properties, high transparency, and low haze, even if the thickness of the layer is about 1 μm. In the case in which the compounding ratio of the ITO powder is 90.0% by weight or more, the film is colored by the ITO powder and the haze degree therein increases, thereby increasing metallic luster and causing peeling or adhesive failure of the infrared ray blocking layer, so that adhesion to a base film becomes inferior. In the case in which the compounding ratio of the ITO powder is 60.0% by weight or less, the object, i.e., infrared ray blocking ability, is not obtained, thereby resulting in undesirably high HAZE values due to the difference between refractive index of the particles of the ITO powder and that of the resin.

D. Pigments

In the present invention, a pigment such as ZnO, $SnO_2$, $TiO_2$, or the like, can be added to the infrared ray blocking layer. In other words, an infrared ray blocking layer may be composed of the UV-curing resin according to the present invention, mixed with these pigments and the ITO powder. The pigments are employed as infrared ray blockers with the ITO powder and the wavelengths blocked by the infrared ray blocking pigments range from 1200 to 2500 nm. Therefore, the ITO powder can be combined without reducing the infrared ray blocking properties over the range of infrared wavelengths from 800 to 2500 nm (the so-called "near infrared"). In addition, the pigments are mixed with the UV-curing resin according to the present invention, thereby setting the compounding ratio of the ITO powder within the lower end of the above range, so that the amount of the ITO powder used, which is expensive, is reduced, and the overall cost can be reduced. Furthermore, the average particle size of these pigments must be 100 nm or less in order to obtain metallic luster inhibition and excellent electromagnetic wave transmissivity.

E. Hard Coat Layer

As a hard coat material for forming a hard coat layer, a resin cured by means of radiation or heat, or a combination thereof, can be employed.

As a radiation-cured resin, compounds mixed suitably with a monomer, oligomer, and prepolymer including a polymerizable unsaturated bond such as an acryloyl group, a methacryloyl group, an acryloyloxy group, a methacryloyloxy group, or the like, can be employed in an appropriate ratio. As an example of a monomer, styrene, methyl acrylate, methyl methacrylate, methoxy polyethylene methacrylate, cyclohexyl methacrylate, phenoxy ethyl methacrylate, ethylene glycol dimethacrylate, dipentaerythritol hexaacrylate, trimethylolpropane trimethacrylate, or the like, can be mentioned. As an oligomer or prepolymer, an acrylate such as polyester acrylate, polyurethane acrylate, epoxy acrylate, polyether acrylate, alkyd acrylate, melamine acrylate, silicone acrylate, or the like, an unsaturated polyester, an epoxy-type compound, or the like, can be mentioned. These can be employed alone or in combination. In the case in which flexibility of the curing film is required, the amount of monomer employed is reduced. Furthermore, in order to reduce cross-linking density, it is preferable that an acrylic monomer having mono-functional or bi-functional acrylate be employed. Whereas in the case in which hard durability such as thermal resistance, wear resistance, solvent resistance, or the like, of the curing film is required, it is preferably that the amount of monomer be increased or that an acrylic monomer having tri-functional or greater acrylate be employed.

In order to cure the radiation-curing resin as described above, for example, it is necessary that radiation such as UV, electron beam, X-ray, or the like, be irradiated on the resin, and a polymerization initiator can be added to the resin in an appropriate ratio, as necessary. In the case of curing by means of irradiating with UV, a photopolymerization initiator must be added. As a photopolymerization initiator, an acetophenone such as diethoxy acetophenone, 2-hydroxy-2-methyl-1-phenylpropan-1-one, benzyl dimethyl ketal, 1-hydroxycyclohexyl-phenylketone, 2-methyl-2-monophorino (4-thiomethylphenyl)propan-1-one, or the like; a benzoin ether such as benzoin methylether, benzoin ethylether, benzoin isopropylether, benzoin isobutylether, or the like; a benzophenone such as benzophenone, o-benzoyl ethyl benzoate, 4-phenyl benzophenone, 4-benzoyl-4'-methyl-diphenylsulfide, 4-benzoyl-N,N-dimethyl-N-[2-(1-oxo-2-propenyloxy)ethyl] benzene methanaminuim bromide, (4-benzoylbenzyl)trimethyl ammonium chloride, or the like; a thioxanthone such as 2,4-diethyl thioxanthone, 1-chloro-4-dichloro thioxanthone, or the like; 2,4,6-trimethylbenzoyl diphenylbenzoyl oxide, or the like; can be mentioned. These can be employed alone or in combination. In addition, as an accelerator (sensitizer), an amine-type compound such as N,N-dimethyl paratoluidine, 4,4'-diethylamino benzophenone, or the like, can be employed in combination.

As a resin employed as a hard coat material, since hardness, transparency and adhesion of the layer are excellent, in particular, an epoxy-type compound of a UV-curing-type is preferably employed. As an example of epoxy-type compounds, a glycidyl ether such as tetramethylene glycol diglycidyl ether, propylene glycol diglycidyl ether, neopentyl glycol diglycidyl ether, bisphenol A diglycidyl ether, or the like, an epoxy ester such as 2-hydroxy-3-phenoxypropyl acrylate, an adduct of bisphenol A-diepoxy-acrylic acid, or the like, can be employed. As a polymerization initiator, a photo-cationic polymerization initiator is preferably employed, and the same compounds employed in the above-described infrared ray blocking layer can be mentioned. The combination ratio is preferably in an amount of 0.1 to 10.0% by weight based on the primary agent. With less than 0.1% by weight or more than 10.0% by weight of the photo-cationic polymerization initiators, UV-curing is insufficient.

F. Adhesive Layer

As an adhesive material for forming an adhesive layer, for example, an acrylic adhesive material may be employed. As a curing agent, for example, a cross-linking agent of metal-chelate-type, isocyanate-type or epoxy-type may be employed alone or in combination at an appropriate ratio. Such an adhesive material compounded so that adhesion (according to Japanese Industrial Standard Z0237) in the adhesive layer ranges from 100 to 2000 g per 25 mm is preferable in practice. In addition, thickness of the adhesive layer is preferably from 15 to 25 $\mu$m after setting. The adhesive layer can also yield a UV blocking effect by adding a UV absorber in an appropriate ratio. As a UV absorber, p-t-butylphenyl salicylate, 2-hydroxy-4-methoxybenzophenone, 2-hydroxy-4-octoxybenzophenone, 2,2'-dihydroxy-4-methoxybenzophenone, 2'-(2'-hydroxy-5-methylphenyl)benzotriazole, 2-(2'-hydroxy-3'-t-butyl-5'-methylphenyl)-5-chlorobenzotriazole, 2-(2'-hydroxy-3',5'-di-t-butylphenyl)benzotriazole, or the like, can be preferably employed.

G. Other Materials

Solvents Added to the Coating Materials for the Infrared Ray Blocking Layer

The coating materials for the infrared ray blocking layer comprises of the ITO powder and the UV-curing resin. As a solvent therefor, various organic solvents such as benzene, toluene, acetone, methylethylketone, isophorone, cyclohexanone, or the like, can be added alone or in a combination of two or more thereof in an appropriate ratio.

Surfactants Added to the Coating Materials for the Infrared Ray Blocking Layer

In order to improve dispersibility of the ITO powder, a very small quantity of surfactant (for example, a non-ionic type) can be added to the coating materials for the infrared ray blocking layer.

In the infrared ray blocking film according to the present invention, in order to easily provide an infrared ray blocking layer on a base film and a hard coat layer on an infrared ray blocking layer and to have high adhesion between each layer, the higher the wettability of the infrared ray blocking layer, the better the infrared ray blocking layer. For example, the wetting index according to Japanese Industrial Standard K6768 is preferably 50 or less, more preferably 46 or less, and most preferably 40 or less. This wetting index can be adjusted by choosing materials and composition of each layer in an appropriate ratio.

The present invention is a film intended mainly for infrared ray blocking, and the UV absorber as described above may be added in at least one layer among the other layers, in a similar manner as in the above-described adhesive layer, so as to also yield a UV blocking effect.

DETAILED DESCRIPTION OF THE PREFERRED EMBODIMENTS

Figure 1:
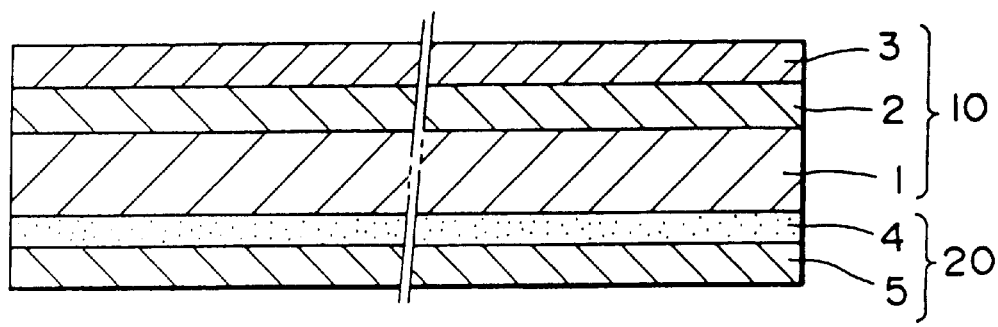
FIG. 1 is a schematic cross-section showing a lamination of an infrared ray blocking transparent film according to an embodiment of the present invention.

An infrared ray blocking transparent film according to the present invention comprises an infrared ray blocking layer provided by coating UV-curing resin including ITO powder and photo-cationic polymerization initiator on a surface of a base film. The preferred embodiment of the useful lamination is as follows. As shown in FIG. 1, an infrared ray blocking layer 2 is provided on a surface of a base film 1; a hard coat layer 3 is further provided on a surface of this infrared ray blocking layer 2; an adhesive layer 4 is provided on a rear surface of the base film 1; and a separate material 5 is further provided on a rear surface of the adhesive layer 4.

In order to produce this lamination, the following method, etc., can be employed. A first film 10 in which an infrared ray blocking layer 2 is coated on a surface of a base film 1 and a hard coat layer 3 is coated on the infrared blocking layer 2, in this order, and a second film 20 in which an adhesive layer 4 is coated on a surface of a separate material 5 are produced, respectively, and the base film 1 of the first film 10 is adhered on the adhesive layer 4 of the second film 20, whereby both films 10 and 20 are laminated to each other. When the film is used in practice, the adhesive layer 4 is exposed by taking the separate material 5 off and is adhered to glass, etc. In this case, the base film 1, the hard coat layer 3 and the adhesive layer 4 require high transparency.

According to this lamination, since the hard coat layer has high hardness as described above as well as the infrared ray blocking layer, hardness and durability of a surface layer are improved by these two layers. Here, since in addition to the improvement of durability of the film surface, the cost of production is lower, UV-curing resin is preferably employed in the hard coat layer. An infrared ray blocking lay is provided on a surface of a base film and is put between a hard coat layer provided on a surface of the infrared ray blocking layer and the base film, whereby light scattering is not significantly caused by unevenness of an interface, so that decrease of HAZE value and high transparency can be achieved.

EXAMPLES

The characteristics according to the present invention will be explained with Examples. In the following, "parts" refer to "parts by weight".

Example 1

Composition of the Coating Material for Infrared Ray Blocking Layer

ITO powder, 65 parts (primary particle size: 30 nm; component mole ratio: In/Sn/O$_2$=100/5/0.9)

UV-curing resin (monomer)

Acrylic-type compound (dipentaerythritol polyacrylate), 8 parts

Epoxy-type compound (trade name: Celloxide 2021; produced by Daicel Chemical Industries, Ltd.), 8 parts UV-curing resin (photo-cationic polymerization initiator)

Compound Represented by the Following Formula, 1 Part

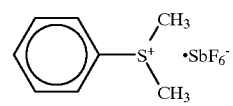

Solvent

Methylethylketone, 18 parts

The coating material for infrared ray blocking layer was obtained by mixing and dispersing the above-described materials using a paint shaker with zirconium oxide beads for 10 hours.

Subsequently, the mixed coating material, with the acrylic beads removed, was coated using an applicator on one surface of a high-transparency PET film (trade name: Merimex #707; produced by ICI Corporation) as a base film having a film thickness of 50 μm and was dried at 100° C. Thereafter, the film was irradiated at 120 W by UV radiation to cure the coating material, and an infrared ray blocking layer having a thickness of 1 μm was formed. Subsequently, an epoxy-acrylic-type UV-curing resin (trade name: KR-566; produced by Asahi Denka Kogyo K.K.), which is the hard coat material, was coated on the surface of the infrared ray blocking layer using an applicator. Thereafter, the film was irradiated by UV radiation at 120 W to cure the hard coat material and a hard coat layer having a thickness of 2 μm was formed. Subsequently, the adhesive material mixed with 100 parts of an acrylic adhesive material (trade name: AS-6000; produced by Ippousha Fats and Oils Industry Co., Ltd.), 1 part of a curing agent (polyisocyanate), and 20 parts of solvent (toluene/ethyl acetate/butanol=5/4/1), was coated on a rear surface of the base film using an applicator and an adhesive layer having a thickness of 20 μm was formed; an infrared ray blocking transparent film of Example 1 was thereby obtained. This lamination is similar to that shown in FIG. 1.

Example 2

Composition of the Coating Material for Infrared Ray Blocking Layer

ITO powder, 65 parts (primary particle size: 30 nm; component mole ratio: In/Sn/O$_2$=100/5/0.9)

UV-curing resin (monomer)

Acrylic-type compound (tripentaerythritol polyacrylate), 8 parts

Epoxy-type compound (trade name: Cyracure UVR-6110; produced by Union Carbide Corp.), 8 parts UV-curing resin (photo-cationic polymerization initiator) (trade name: Cyracure UVI-6990; produced by Union Carbide Corp.), 1 part Solvent Methylisobutylketone, 18 parts The coating material for the infrared ray blocking layer was prepared by mixing the above-described materials, and an infrared ray blocking transparent film of Example 2 was obtained, in a similar manner as in Example 1.

Example 3

Composition of the Coating Material for Infrared Ray Blocking Layer

ITO powder, 65 parts (primary particle size: 30 nm; component mole ratio: In/Sn/O$_2$=100/5/0.9)

UV-curing resin (monomer)

Acrylic-type compound (tetrapentaerythritol polyacrylate), 8 parts

Epoxy-type compound (trade name: Epikote 828; produced by Yuka Shell Epoxy Inc.), 8 parts UV-curing resin (photo-cationic polymerization initiator) (trade name: Cyracure UVI-6990; produced by Union Carbide Corp.), 1 part Solvent Cyclohexanone, 18 parts The coating material for the infrared ray blocking layer was prepared by mixing the above-described materials, and an infrared ray blocking transparent film of Example 3 was obtained, in a similar manner as in Example 1.

Example 4

Composition of the Coating Material for Infrared Ray Blocking Layer

ITO powder, 58 parts (primary particle size: 30 nm; component mole ratio: $In/Sn/O_2=100/5/0.9$)

UV-curing resin (monomer)

Acrylic-type compound (dipentaerythritol polyacrylate), 6 parts

Acrylic-type compound (tripentaerythritol polyacrylate), 6 parts

Epoxy-type compound (trade name: Epikote 828; produced by Yuka Shell Epoxy Inc.), 11 parts UV-curing resin (photo-cationic polymerization initiator) (trade name: BBI-102; produced by Midori Kagaku Co., Ltd.), 1 part Solvent Methylethylketone, 18 parts The coating material for the infrared ray blocking layer was prepared by mixing the above-described materials, and an infrared ray blocking transparent film of Example 4 was obtained, in a similar manner as in Example 1.

Example 5

Composition of the Coating Material for Infrared Ray Blocking Layer

ITO powder, 65 parts (primary particle size: 30 nm; component mole ratio: $In/Sn/O_2=100/5/0.9$)

UV-curing resin (monomer)

Acrylic-type compound (1,6-hexanediol dimethacrylate), 4 parts

Acrylic-type compound (tripentaerythritol polyacrylate), 4 parts

Epoxy-type compound (trade name: Epikote 828; produced by Yuka Shell Epoxy Inc.), 8 parts UV-curing resin (photo-cationic polymerization initiator) (trade name: MP-103; produced by Midori Kagaku Co., Ltd.), 1 part Solvent Methylethylketone, 18 parts The coating material for the infrared ray blocking layer was prepared by mixing the above-described materials, and an infrared ray blocking transparent film of Example 5 was obtained, in a similar manner as in Example 1.

Example 6

Figure 2:
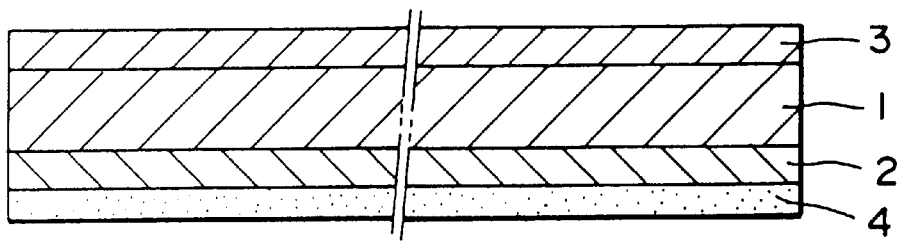
FIG. 2 is a schematic cross-section showing a lamination of another infrared ray blocking transparent film according to an embodiment of the present invention.

An infrared ray blocking transparent film of Example 6, having the lamination shown in FIG. 2, was produced by employing the same coating material for the infrared ray blocking layer as in Example 3. The infrared ray blocking transparent film shown in FIG. 2 has a lamination from which provides a hard coat layer 3 on a surface of a base film 1 and provides an infrared ray blocking layer 2 and an adhesive layer 4 on a rear surface of the base film 1, in this order. The base film, the materials of the infrared ray blocking layer and the adhesive layer and the coating methods, were similar to those of Example 1.

Example 7 (Example of Thin Layer)

An infrared ray blocking transparent film of Example 7 was obtained in a similar manner as in Example 3, with the exception that the thickness of the infrared ray blocking layer was 0.6 µm.

Example 8

Composition of the Coating Material for Infrared Ray Blocking Layer

ITO powder, 65 parts (primary particle size: 30 nm; component mole ratio: $In/Sn/O_2=100/5/0.9$)

UV-curing resin (monomer)

Acrylic-type compound (1,6-hexanediol dimethacrylate), 16 parts

UV-curing resin (photo-cationic polymerization initiator) (trade name: MP-103; produced by Midori Kagaku Co., Ltd.), 1 part Solvent Methylethylketone, 18 parts The coating material for the infrared ray blocking layer was prepared by mixing the above-described materials, and an infrared ray blocking transparent film of Example 8 was obtained, in a similar manner as in Example 1.

Example 9 (Example of Thick Layer)

An infrared ray blocking transparent film of Example 9 was obtained in a similar manner as in Example 3, with the exception that the thickness of the infrared ray blocking layer was 4 µm.

Example 10 (Example of Thick Layer)

An infrared ray blocking transparent film of Example 10 was obtained in a similar manner as in Example 8, with the exception that the thickness of the infrared ray blocking layer was 4 µm.

Comparative Example 1 (Example Not Containing Photo-Cationic Polymerization Initiator According to the Present Invention)

Composition of the Coating Material for Infrared Ray Blocking Layer

ITO powder, 65 parts (primary particle size: 30 nm; component mole ratio: $In/Sn/O_2=100/5/0.9$)

UV-curing resin (monomer)

Acrylic-type compound (tetrapentaerythritol polyacrylate), 8 parts

Epoxy-type compound (trade name: Epikote 828; produced by Yuka Shell Epoxy Inc.), 8 parts UV-curing resin (radical-type polymerization initiator) (trade name: Irgacure 184; produced by CIBA-GEIGY AG.), 1 part Solvent Cyclohexanone, 18 parts The coating material for the infrared ray blocking layer was prepared by mixing the above-described materials, and a comparative infrared ray blocking transparent film of Comparative Example 1 was obtained, in a similar manner as in Example 1.

Comparative Example 2 (Example Not Containing Photo-Cationic Polymerization Initiator According to the Present Invention and Having a Thick Thickness)

A comparative infrared ray blocking transparent film of Comparative Example 2 was obtained in a similar manner as in Comparative Example 1, with the exception that the thickness of the infrared ray blocking layer was 3 μm.

Comparative Example 3 (Example Not Containing Photo-Cationic Polymerization Initiator According to the Present Invention)

Composition of the Coating Material for Infrared Ray Blocking Layer

ITO powder, 65 parts (primary particle size: 30 nm; component mole ratio: $In/Sn/O_2=100/5/0.9$)
Thermoplastic resin (2-ethylhexyl acetate), 16 parts
Solvent
Toluene, 19 parts The coating material for the infrared ray blocking layer was prepared by mixing the above-described materials, and a comparative infrared ray blocking transparent film of Comparative Example 3 was obtained, in a similar manner as in Example 1.

With regard to the infrared ray blocking transparent film of Examples 1 to 10 and the comparative infrared ray blocking transparent film of Comparative Examples 1 to 3, the following tests were performed. These results were shown in Table 1.

1. Thickness of Infrared Ray Blocking Layer

Thickness of each infrared ray blocking layer was measured on the basis of sectional photographs taken by electron microscope.

2. Light Transmissivity (Transparency)

Light transmissivity of each film was measured at wavelengths of 550, 1000, and 1500 nm, using a spectrophotometer (trade name: UV-3100, produced by Shimadzu Corporation).

3. HAZE Value (Transparency)

HAZE value was measured, using a HAZE meter (trade name: NDH2000, produced by NIPPON DENSHOKU Co., Ltd.).

4. Adhesion (Cross-Cut Adhesion Test)

Adhesion of each film was evaluated by performing a cross-cut adhesion test according to Japanese Industrial Standard K5400, using a film stored at ordinary temperature (room temperature) and a film soaked in water at 40° C. for 200 hours and taken out. In this evaluation, the following criteria were used: cases where the test evaluation was 10 (adhesion is superior): ⊚; 8 (sufficient adhesion): ○; 6 (slight problems in practical use observed): Δ; 4~40 (problems in practical use observed): ×.

5. Adhesion (Visual Observation)

Adhesion of base films, infrared ray blocking layers, and hard coat layers were assessed by visual observation. In this evaluation, the following criteria were used: cases where the layer adhered sufficiently: ○; cases where the layer did not adhere: ×.

6. Adhesion (Degradation)

Degradation of adhesion of an infrared ray blocking layer or a hard coat layer after 200 hours had passed since the film was produced was measured using UV long life fade meter (FAL-AU type). In this evaluation, the following criteria were used: cases where the layer adhered sufficiently: ○; cases where the layer did not adhere: ×.

7. Appearance Change Over Time

Appearance of an infrared ray blocking layer or a hard coat layer after one month had passed since the film was produced was observed. In this evaluation, the following criteria were used: cases where the transparency of the layer was maintained and the appearance thereof did not change: ○; cases where color changes, etc., were observed in the layer: the state thereof described in Table 1.

8. Hardness of the Film (Pencil Scratch Value)

Hardness of surface of the film was measured by the scratch hardness tester method according to Japanese Industrial Standard K5400 to obtain pencil scratch values.

TABLE 1

| | Thickness of Infrared Ray Blocking layer (μm) | Light Transmissivity | | | HAZE Value | Adhesion (cross-cut adhesion test) | | Adhesion (visual observation) | Adhesion (degradation) | Appearance | Hardness |
|---|---|---|---|---|---|---|---|---|---|---|---|
| | | 550 nm | 1000 nm | 1500 nm | | Ordinary Temperature | Warm Water | | | | |
| Example 1 | 1 | 88 | 43 | 3 | 1.0 | ⊚ | ⊚ | ○ | ○ | ○ | 2H |
| Example 2 | 1 | 88 | 43 | 2 | 1.0 | ⊚ | ⊚ | ○ | ○ | ○ | 2H |
| Example 3 | 1 | 88 | 44 | 2 | 1.0 | ⊚ | ⊚ | ○ | ○ | ○ | 2H |
| Example 4 | 1 | 88 | 44 | 3 | 1.0 | ⊚ | ⊚ | ○ | ○ | ○ | H |
| Example 5 | 1 | 88 | 44 | 3 | 1.0 | ⊚ | ⊚ | ○ | ○ | ○ | 2H |
| Example 6 | 1 | 84 | 45 | 4 | 1.0 | ⊚ | ⊚ | ○ | ○ | ○ | 2H |
| Example 7 | 0.6 | 88 | 47 | 5 | 0.7 | ⊚ | ○ | ○ | ○ | ○ | H |
| Example 8 | 1 | 88 | 44 | 4 | 1.1 | ⊚ | ○ | ○ | ○ | ○ | H |
| Example 9 | 4 | 86 | 43 | 4 | 1.2 | ⊚ | ○ | ○ | ○ | ○ | 2H |
| Example 10 | 4 | 86 | 42 | 4 | 1.2 | ⊚ | ○ | ○ | ○ | ○ | 2H |
| Comparative Example 1 | 1 | 88 | 44 | 4 | 3.0 | × | × | × | × | White Turbidity | F |
| Comparative Example 2 | 3 | 86 | 42 | 4 | 1.5 | ○ | × | ○ | × | Slightly White Turbidity | H |
| Comparative Example 3 | 1 | 88 | 43 | 3 | 1.0 | × | × | ○ | × | ○ | HB |

As is apparent from the results shown in Table 1, the infrared ray blocking films according to the present invention were confirmed to have low HAZE values, high transparency, and the high adhesion, and the hardness thereof was sufficient. In particular, the films according to Examples 1 to 6 were very practical since the adhesion and the hardness are superior. In contrast, with respect to the films according to Comparative Examples 1 and 2, employing UV-curing resin containing the conventional radical polymerization initiator instead of the photo-cationic polymerization initiator in the infrared ray blocking layer, and the film according to Comparative Example 3 employing thermoplastic resin in the infrared ray blocking layer, the transparency and the adhesion were insufficient. In particular, with respect to the films according to Comparative Examples 1 and 3 having a thickness of the infrared ray blocking layer of 1 μm, the hardness thereof was inferior. Therefore, the effects of the present invention are clear.

As explained above, according to the present invention, since UV-curing resin containing the photo-cationic polymerization initiator is employed as a resin forming an infrared ray blocking layer, the infrared ray blocking film can be thinner, have higher transparency, and have higher adhesion than that of conventional films; the cost for forming the film can thereby be reduced due to reduction of the amount of forming materials used for the infrared ray blocking layer.

What is claimed is:

1. An infrared ray blocking transparent film comprising at least a base film and an infrared ray blocking layer provided on a surface of said base film, wherein said infrared ray blocking layer includes an indium tin oxide powder and a resin, and said resin comprising of a UV-curing resin including a photo-cationic polymerization initiator.

2. An infrared ray blocking transparent film as recited in claim 1, wherein said indium tin oxide powder has a mole ratio of oxygen to indium of 0.5/100 to 10/100.

3. An infrared ray blocking transparent film as recited in claim 2, wherein said UV-curing resin comprises monomer including at least an acrylic-type compound or an epoxy-type compound.

4. An infrared rey blocking transparent film as recited in claim 3, wherein said acrylic-type compound comprises at least one of the compounds represented by the following formulas:

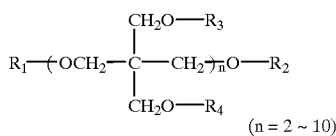

(n = 2 ~ 10)

wherein at least one of $R_1$, $R_2$, $R_3$ and $R_4$ is

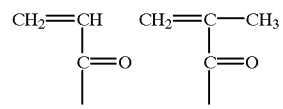

and the others represent alkyl groups; the alkyl groups preferably being lower alkyl groups having one to six carbon atoms.

5. An infrared ray blocking transparent film as recited in claim 4, further comprising a hard coat layer provided on a surface of said infrared ray blocking layer.

6. An infrared ray blocking transparent film as recited in claim 5, wherein said hard coat layer comprises a resin including a UV-curing resin.

7. An infrared ray blocking transparent film as recited in claim 3, further comprising a hard coat layer provided on a surface of said infrared ray blocking layer.

8. An infrared ray blocking transparent film as recited in claim 7, wherein said hard coat layer comprises a resin including a UV-curing resin.

9. An infrared ray blocking transparent film as recited in claim 2, further comprising a hard coat layer provided on a surface of said infrared ray blocking layer.

10. An infrared ray blocking transparent film as recited in claim 9, wherein said hard coat layer comprises a resin including a UV-curing resin.

11. An infrared ray blocking transparent film as recited in claim 1, wherein said UV-curing resin comprises monomer including at least an acrylic-type compound or an epoxy-type compound.

12. An infrared ray blocking transparent film as recited in claim 11, wherein said acrylic-type compound comprises at least one of the compounds represented by the following formulas:

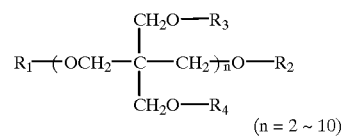

(n = 2 ~ 10)

wherein at least one of $R_1$, $R_2$, $R_3$ and $R_4$ is

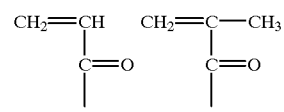

and the others represent alkyl groups; the alkyl groups preferably being lower alkyl groups having one to six carbon atoms.

13. An infrared ray blocking transparent film as recited in claim 12, further comprising a hard coat layer provided on a surface of said infrared ray blocking layer.

14. An infrared ray blocking transparent film as recited in claim 13, wherein said hard coat layer comprises a resin including a UV-curing resin.

15. An infrared ray blocking transparent film as recited in claim 11, further comprising a hard coat layer provided on a surface of said infrared ray blocking layer.

16. An infrared ray blocking transparent film as recited in claim 15, wherein said hard coat layer comprises a resin including a UV-curing resin.

17. An infrared ray blocking transparent film as recited in claim 1, further comprising a hard coat layer provided on a surface of said infrared ray blocking layer.

18. An infrared ray blocking transparent film as recited in claim 17, wherein said hard coat layer comprises a resin including a UV-curing resin.

* * * * *